US012186878B2

(12) United States Patent
Greitmann et al.

(10) Patent No.: US 12,186,878 B2
(45) Date of Patent: Jan. 7, 2025

(54) POWER TOOL HAVING A FIRST AND A SECOND RECHARGEABLE BATTERY

(71) Applicant: Hilti Aktiengesellschaft, Schaan (LI)

(72) Inventors: Ralf Greitmann, Kaufering (DE); Roland Meuer, Ettringen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/039,457

(22) PCT Filed: Nov. 17, 2021

(86) PCT No.: PCT/EP2021/081928
§ 371 (c)(1),
(2) Date: May 30, 2023

(87) PCT Pub. No.: WO2022/117337
PCT Pub. Date: Jun. 9, 2022

(65) Prior Publication Data
US 2024/0051109 A1 Feb. 15, 2024

(30) Foreign Application Priority Data
Dec. 4, 2020 (EP) .................................... 20211898

(51) Int. Cl.
*B25F 5/00* (2006.01)
*B24B 27/08* (2006.01)

(52) U.S. Cl.
CPC .............. *B25F 5/006* (2013.01); *B24B 27/08* (2013.01)

(58) Field of Classification Search
CPC ...... H02J 7/0045; H02J 7/0063; H02J 7/0013; H02J 7/00; B24B 23/028; B24B 23/02; B24B 27/08; B25F 5/02; B25F 5/006
See application file for complete search history.

(56) References Cited

U.S. PATENT DOCUMENTS 3,949,817 A 4/1976 Rice
5,016,355 A 5/1991 Gassen et al.
(Continued)

FOREIGN PATENT DOCUMENTS

DE 7406974 U 10/1974
DE 8226112 U1 11/1982
(Continued)

OTHER PUBLICATIONS

International Search Report of PCT/EP2021/081926 dated Feb. 1, 2022.
(Continued)

*Primary Examiner* — Nathaniel C Chukwurah
(74) *Attorney, Agent, or Firm* — Davidson Kappel LLC

(57) ABSTRACT

A power tool having a first rechargeable battery and a second rechargeable battery as energy sources, wherein the power tool includes a main body and a motor. In particular, the power tool is characterized in that the main body has a first receiving space for receiving the first rechargeable battery, and a second receiving space for receiving the second rechargeable battery, wherein the receiving spaces are arranged in such a way within a housing of the main body that the rechargeable batteries are accessible and replaceable from a rear side of the main body, wherein the receiving spaces for the rechargeable batteries form a lower boundary of the main body of the power tool. The receiving spaces for the rechargeable batteries or the rechargeable batteries themselves are arranged in a lower, rear region of the main body, where they are particularly well protected against falling, moisture or the like.

20 Claims, 7 Drawing Sheets

(56) References Cited

U.S. PATENT DOCUMENTS

| | | | | |
|---|---|---|---|---|
| 5,099,160 | A | 3/1992 | Stroezel et al. | |
| 5,960,549 | A | 10/1999 | Hoeppner et al. | |
| 2004/0098869 | A1 | 5/2004 | Ashfield | |
| 2011/0198103 | A1 * | 8/2011 | Suzuki | H02J 7/0048 173/46 |
| 2013/0098647 | A1 | 4/2013 | Martinsson et al. | |
| 2015/0328763 | A1 * | 11/2015 | Ito | H02J 7/0045 173/217 |
| 2017/0182649 | A1 * | 6/2017 | Ito | B24B 23/02 |
| 2018/0361562 | A1 | 12/2018 | Baxivanelis et al. | |
| 2019/0077005 | A1 * | 3/2019 | Ito | H02J 7/00 |
| 2022/0176511 | A1 | 6/2022 | Greitmann et al. | |

FOREIGN PATENT DOCUMENTS

| | | | |
|---|---|---|---|
| DE | 102016106559 | A1 | 10/2017 |
| EP | 3181305 | A1 | 6/2017 |
| EP | 3733352 | A1 | 11/2020 |
| WO | WO9000828 | A1 | 1/1990 |
| WO | WO2022/117335 | A1 | 6/2022 |
| WO | WO 2022/117336 | A1 | 6/2022 |
| WO | WO 2022/117337 | | 6/2022 |

OTHER PUBLICATIONS

International Search Report of PCT/EP2021/081927 dated Feb. 25, 2022.

International Search Report of PCT/EP2021/081928 dated Feb. 23, 2022.

* cited by examiner

POWER TOOL HAVING A FIRST AND A SECOND RECHARGEABLE BATTERY

The present invention relates to a power tool having a first rechargeable battery and a second rechargeable battery as energy sources, wherein the power tool comprises a main body and a motor.

BACKGROUND

In the power tool sector, cut-off grinders or angle grinders by means of which cuts can be made in a substrate to be machined or which can be used to machine the surface of a substrate are known. Such cut-off or angle grinders generally have a disk-shaped tool, which is referred to as a cutting or grinding disk.

Increases in the available capacity of rechargeable batteries have seen the increasing commercial introduction of battery- or rechargeable-battery-driven cut-off grinders with cutting disks and blade diameters greater than 230 mm; especially for applications in which gasoline-powered cut-off grinders have been used hitherto.

SUMMARY OF THE INVENTION

With these cut-off grinders, unlike angle grinders, cutting with water to bind dust is an important function. In constructing the tools, therefore, care is normally taken to ensure that the rechargeable batteries and their interface are protected from spray when wet-cutting.

For other applications, such as cutting steel or dry-cutting concrete, the rechargeable batteries and the battery interface should furthermore be protected from metal chips, flying sparks and dust. Moreover, it is advantageous if the rechargeable batteries, their interface and especially the contacts of the rechargeable batteries are protected from environmental influences such as rain and humidity.

The prior art therefore includes power tools in which—depending on construction—the rechargeable batteries are protected by various parts of the housing of the power tool during cutting. In the case of some cut-off grinders powered by rechargeable batteries, additional flaps or covers, which form a sealed space for the rechargeable battery, are provided for this purpose. However, it has been found that cut-off grinders with such additional flaps or covers have a number of disadvantages in use. On the one hand, the additional component may increase the susceptibility of the power tool to faults. In addition, the flaps or covers often entail additional effort when changing the rechargeable battery. Moreover, a state of charge of the rechargeable battery cannot be displayed directly on the rechargeable battery since the rechargeable battery is fully enclosed, in particular by the additional cover or the additional flap. It is often also possible to operate such cut-off grinders with the flap open or with the cover open, in which case there may be unwanted dust penetration into the battery receiving space.

In the case of many other power tools that are known from the prior art, the rechargeable battery is arranged in an upper region of the main body of the power tool. This may allow a certain protection for the power tool during cutting but provides little or no protection for the power tool and its internal components against atmospheric conditions, e.g. rain, or dirty water that may form during the operation of a cut-off grinder in the wet cutting mode.

It is an underlying object of the present invention to overcome the above-described defects and disadvantages of the prior art and to provide a power tool in which the rechargeable batteries and their contacts, interfaces, displays and operating means are provided with optimum protection from mechanical damage, e.g. if dropped, or from atmospheric conditions such as humidity, rain or moisture. Moreover, the rechargeable batteries should be easily accessible and easy to replace, despite the optimized protection. In this context, those in the industry would welcome it if optimum protection for the rechargeable batteries could be ensured without the need to provide additional flaps or covers on the power tool to protect the rechargeable batteries. In addition, the construction of the power tool and the arrangement of the components within the power tool should be as simple, compact and robust as possible, and the power tool should have good ergonomics.

According to the invention, a power tool having a first rechargeable battery and a second rechargeable battery as energy sources is provided. The power tool furthermore has a main body and a motor. In particular, the power tool is characterized in that the main body has a first receiving space for receiving the first rechargeable battery, and a second receiving space for receiving the second rechargeable battery, wherein the receiving spaces are arranged in such a way within a housing of the main body that the rechargeable batteries are accessible and replaceable from a rear side of the main body, wherein the receiving spaces for the rechargeable batteries form a lower boundary of the main body of the power tool. For the purposes of the invention, this means that the receiving spaces for the rechargeable batteries or the rechargeable batteries themselves are arranged in a lower, rear region of the main body, where they are particularly well protected against falling, moisture or the like. For the purposes of the invention, it is preferred that the rechargeable batteries are arranged in spatial proximity to an underside and on the rear side of the main body of the power tool, as a result of which, on the one hand, the rechargeable batteries are protected in an optimum manner from mechanical stresses, e.g. in the event of a fall, and, on the other hand, are protected in an optimum manner from humidity, moisture and rain. Examples of a possible arrangement of the rechargeable batteries within the main body of the power tool are depicted in FIGS. 1 and 2.

For the purposes of the invention, it is preferred that different types of rechargeable battery can be used as energy sources. In this context, one possibility is to use rechargeable batteries which have a relatively large volume and a large capacity, for example. However, there may likewise be a preference for the use of small rechargeable batteries with a relatively small capacity. As one preferred possibility, the first and the second rechargeable battery may be of the same type. However, another preferred possibility for the purposes of the invention is to use different types of rechargeable battery as energy sources. The rechargeable batteries used are preferably designed to work with the same interface on the power tool. In other words, the power tool can have interfaces and/or contact surfaces which can interact with different types of rechargeable battery. This can be achieved, for example, if the rechargeable batteries used as energy sources in the power tool have interfaces and/or contact surfaces which are designed to correspond to the interfaces and contact surfaces of the power tool. The capacity of the rechargeable batteries can be between 3 and 15 ampere hours (Ah), and their volume can be between 700 and 1500 $cm^3$, depending on capacity.

In particular, the invention proposes an arrangement of components for a preferably hand-held, battery-operated cut-off grinder having a plurality of rechargeable batteries, preferably two rechargeable batteries. The position of the rechargeable batteries and of the interface for the rechargeable batteries is preferably chosen in such a way that the rechargeable batteries are optimally protected against dust, metal chips, sparks or sludge during cutting. Tests have shown that the rechargeable batteries and their interface as well as their contacts can be protected in a particularly effective manner from environmental influences, such as rain or moisture, by means of the invention or the arrangement.

The arrangement of the further subassemblies of the power tool, such as electronics, motor, handles, transmission and cutting disk, is preferably adapted around the position of the rechargeable batteries. The arrangement is optimized particularly in respect of robustness, compactness, ergonomics and assembly. In particular, the rechargeable batteries are particularly easily accessible, and therefore they can be exchanged particularly quickly and simply when required. Moreover, a state of charge indicator for the rechargeable batteries is particularly easy to see for a user of the power tool in the case of the arrangement of the rechargeable batteries in a lower, rear region of the main body of the power tool, and the user is therefore aware of the current state of charge of the rechargeable batteries at any time during the operation of the power tool. This enables the user to apportion and plan ahead the work with the cut-off grinder.

For the purposes of the invention, it is preferred that the receiving spaces for the rechargeable batteries are arranged adjacent to one another. They are preferably of similar or identical construction to one another. For the purposes of the invention, it is preferred that the two receiving spaces for the two rechargeable batteries are arranged symmetrically with respect to an imaginary longitudinal axis extending centrally through the power tool. In other words, the receiving spaces can be situated on a right-hand and a left-hand side of the virtual longitudinal axis of the power tool. This makes it possible to keep the construction of the power tool within its main body simple and compact. Moreover, the compact construction increases the robustness of the power tool.

The invention with the arrangement of the rechargeable batteries in two receiving spaces, which are preferably arranged adjacent to one another, making the rechargeable batteries particularly easily accessible from the rear side of the main body, advantageously allows an optimized, simple construction of a battery-operated cut-off grinder in which changing the rechargeable batteries can be performed in a particularly simple manner. In addition, good protection of the rechargeable batteries and of the interface during the operation of the power tool can be ensured, as can good protection against environmental influences, such as rain or moisture. The construction of the power tool, in which the receiving spaces for the rechargeable batteries are arranged in a lower, rear region of the main body, represents a robust and simple construction of the tool and furthermore allows good visibility of the state of charge indicator of the rechargeable batteries.

For the purposes of the invention, it is preferred that the power tool is a cut-off grinder. The grinder can comprise a rear region, which is formed by a main body and a protection frame, for example. The main body of the cut-off grinder can be surrounded by a housing, and can comprise a control unit, a drive or drive train and/or a motor. The protection frame can comprise a front, circumferential handle and a second, upper handle. The front part of the power tool is formed by the tool thereof, which, particularly in the case where the power tool is designed as a cut-off grinder, is a disk-shaped tool. In particular, it may be referred to as a cutting disk. For the purposes of the invention, it is preferred that the spatial directions of "front" and "rear" are defined by the front power tool region formed by the tool and by the rear power tool region formed inter alia by the main body. The spatial regions "top" and "bottom" or "upper side" and "underside" of the power tool are preferably defined by the upper handle ("upper side"), which, for the purposes of the invention, is also preferably referred to as the second handle, and by the protection frame, the underside of which preferably extends on the underside of the power tool.

For the purposes of the invention, it is preferred that the power tool comprises a first, circumferential handle, a second, upper handle, and a protection frame for protecting the main body of the power tool. Details of these components of the power tool can be found, in particular, in the figures. The first, circumferential handle preferably extends in the region of the transition between the front and the rear region of the power tool and is normally gripped with the left hand by a right-handed person when using the power tool. To this extent, the first, circumferential handle can also be used for carrying the power tool. The circumferential configuration of the first handle means that the first handle provides effective impact protection at the sides of the power tool, especially if the power tool were to fall on the right-hand or left-hand side of the tool when dropped. In particular, the circumferential configuration of the first handle protects the power tool components arranged in the main body of the power tool, such as the motor, drive or transmission, but also, of course, the rechargeable batteries. For the purposes of the invention, it is preferred that a plane, in which the first handle predominantly extends, extends substantially orthogonally to a longitudinal axis of the power tool. In particular, the longitudinal axis, which can be laid virtually through the power tool, extends centrally through the power tool and extends from the front region of the power tool in the direction of the rear region thereof. For the purposes of the invention, it is preferred that the plane, in which the first handle predominantly extends, is substantially perpendicular to the longitudinal axis of the power tool.

The second, upper handle preferably extends substantially parallel to the virtual longitudinal axis of the power tool. This second handle is normally gripped by the right hand of a right-handed user when using the power tool. For the purposes of the invention, it is preferred that the upper handle projects beyond the main body of the power tool in a rearward spatial direction, thus ensuring that the main body and the internal components thereof are well protected against a fall and landing of the power tool on the rear side of the power tool. Owing to the fact that the second handle projects beyond the rear side of the main body of the power tool, an overlap is preferably formed. For the purposes of the invention, the term "overlap" preferably describes the distance between a substantially vertical rear wall of the main body of the power tool and a point on the rear part of the upper handle which is furthest away. This distance or overlap is in a range of from 1 to 12 cm, preferably 3 to 9 cm, and particularly preferably about 6 cm, for example.

For the purposes of the invention, it is preferred that the second handle is arranged above the electronics of the power tool and, on its upper side and/or its underside, comprises operating switches for the power tool. Owing to the fact that the second handle of the power tool is normally gripped by the right hand of a user, the power tool can be operated particularly well by providing the operating switch on the upper side and/or the underside of the second handle. By virtue of the preferred spatial proximity between the electronics of the power tool and the at least one operating switch in the second handle, transfer paths for control commands can be considerably shortened, and the complexity of cabling and circuitry within the power tool can be simplified or reduced. For the purposes of the invention, it is preferred that the region of the second handle which has the at least one operating switch is designated as the central part of the upper handle. A longitudinal axis passing centrally through the central part preferably does not run parallel to a substrate on which the power tool can be set down but slopes at a slope angle of 10 to 30 degrees, preferably at a slope angle of 15 to 25 degrees and, most preferably, at a slope angle of about 20 degrees. By means of this slope, the ergonomics of the upper handle can be considerably improved. The central part of the upper handle is substantially perpendicular to a rear part of the upper handle. Thus, this rear part of the upper handle also extends at the abovementioned slope angle of about 20 degrees with respect to a substantially vertical rear wall of the main body of the power tool. Tests have shown that the slope of the second handle of the power tool considerably improves the ergonomics of the power tool.

In addition, the power tool comprises a protection frame, the underside of which preferably extends on the underside of the power tool. For the purposes of the invention, it is preferred that the protection frame has an L-shaped structure, in particular in a side view of the power tool. In particular, the lower leg of the "L" here extends on the underside of the power tool, while the vertically upward-projecting leg of the preferably laterally reversed "L" extends along the substantially vertical rear wall of the main body of the power tool. Such a simple L structure is preferably present both on the right-hand and on the left-hand side of the power tool, and therefore, for the purposes of the invention, the L-shaped structure is preferably also referred to as a "lateral L-shaped structure". It preferably extends around the main body of the power tool. The two individual L-shaped structures are preferably connected to one another by a connecting web, wherein the connecting web extends through an inner or reach-through space of the upper handle. For the purposes of the invention, it is preferred that the vertically upward-projecting legs of the L-shaped structure of the protection frame form the rear side thereof. The front side of the protection frame can preferably likewise be formed by two vertically upward-projecting legs, which extend substantially parallel to the rearward vertically upward-projecting legs of the protection frame. If the protection frame comprises such vertically upward-projecting legs on the front side, the shape of the protection frame can preferably also be referred to as U-shaped, wherein the protection frame preferably comprises two U-shaped structures which can be arranged on the right-hand and left-hand side of the power tool and are connected to one another by the connecting web. For the purposes of the invention, it is preferred that the rechargeable batteries are arranged in the interior space formed by the U- or L-shaped structures of the protection frame. In other words, the rechargeable batteries can be surrounded by the elements of the protection frame, and thus the protection frame protects the rechargeable batteries in an optimum way from mechanical damage, e.g. due to a fall. For the purposes of the invention, it is preferred that the rechargeable batteries are arranged above the lower leg of the L- or U-shaped structures of the protection frame. The main body of the power tool, the lower boundary of which is formed by the rechargeable batteries, is preferably arranged within the protection frame.

For the purposes of the invention, it is preferred that the rechargeable batteries comprise contacts, by means of which they can be plugged in on the power tool. For this purpose, the power tool comprises a corresponding connection arrangement, with which the contacts of the rechargeable batteries can interact. The power tool preferably comprises an interface, by means of which the energy supply to the power tool and the energy discharge of the rechargeable batteries can be controlled. For the purposes of the invention, there may be a preference for the power tool to comprise an interface which controls the energy discharge from both rechargeable batteries. However, there may likewise be a preference for the power tool to comprise two interfaces, i.e. one interface for each rechargeable battery. For the purposes of the invention, there is a particular preference that the rechargeable batteries are connectable to electronics of the power tool via an interface and contacts.

For the purposes of the invention, it is preferred that an upper side of the housing of the main body of the power tool is of sloping design in order to ensure that liquid runs off in a defined manner. The upper side of the housing of the main body of the power tool preferably faces the underside of the central part of the upper handle. Like this central part of the handle, the upper side of the housing of the power tool is preferably also of sloping design to ensure that rain, dirty water or spray can run off the main body of the power tool in the "downward" spatial direction in an optimum manner. For the purposes of the invention, there is a particular preference for the housing of the main body of the power tool to slope toward the rear. For the purposes of the invention, this preferably means that, when the power tool is set down on a substrate, the front part of the housing of the main body is at a greater distance from the substrate than the rear part of the housing of the main body of the power tool. The slope of the main body of the power tool can be described by a slope angle B, which is preferably formed between an imaginary ground plane on which the power tool can be set down and a plane which can be laid virtually through the surface of the housing or main body of the power tool. The slope angle B is preferably in the region of 5 degrees. Tests have shown that a sloping surface of the housing or main body of the power tool with a slope angle of about 5 degrees allows optimum run-off of rainwater or dirty water.

Furthermore, the housing of the main body of the power tool can have ribs in order to ensure that liquid runs off in a defined manner. In particular, these ribs guide the liquid away to the side in such a way that, in particular, the liquid cannot get into the rear region of the power tool or into the region of the rear side of the main body, where, for example, operating switches of the rechargeable batteries or a state of charge indicator of the rechargeable batteries can be arranged. The slope of the upper side of the housing of the main body of the power tool and/or the provision of the ribs on the housing of the main body of the power tool is an effective means of preventing sensitive components of the power tool or sensitive components that are connected to the rechargeable batteries from coming into contact with humidity, moisture or rain and thereby possibly suffering damage.

The power tool can furthermore be described by a slope angle A. This slope angle A is preferably formed between an imaginary ground plane on which the power tool can be set down and a plane which passes centrally through the motor axis and the axis of the cutting disk. For the purposes of the invention, it is preferred that this slope angle A is in a range of between 10 and 30 degrees, preferably in a range of between 15 and 25 degrees, and is particularly preferably about 20 degrees. The slope angles A and B are illustrated in FIG. 7.

For the purposes of the invention, it is preferred that the power tool manages without an additional flap and without an additional cover for protecting the rechargeable batteries from liquid. By avoiding this additional component, which many conventional power tools have to protect the rechargeable battery, the susceptibility of the power tool to faults can be considerably reduced. In addition, the effort involved in changing the rechargeable batteries can be reduced because it is no longer necessary to hold up a cover or a flap. Moreover, the elimination of the additional covers or flaps makes it possible to provide state of charge indicators directly on the rechargeable batteries, and these can furthermore be arranged in such a way as to be particularly easily visible for the user, meaning that the user of the power tool can obtain an overview of the states of charge of the rechargeable batteries in a particularly simple and quick way.

For the purposes of the invention, it is preferred that the rechargeable batteries or the receiving spaces thereof in the case of the power tool are arranged in the housing of the main body of the power tool, wherein the housing forms a sealed space which, in particular, is firmly closed with respect to dust and/or humidity and moisture. It is thereby possible to avoid unwanted ingress of dust into the battery receiving space in an effective manner. The rechargeable batteries and the receiving spaces thereof are situated in the housing of the power tool, in particular in a rear, lower region, i.e. in spatial proximity to an underside and a rear side of the housing of the power tool.

For the purposes of the invention, it is preferred that the power tool has damping means in order to decouple the handles and the protection frame from vibrations which arise during the operation of the power tool. The damping means preferably comprise springs, wherein, in particular, three springs are provided in order to achieve decoupling of the handles and of the protection frame from the vibrations which arise during the operation of the power tool. Possible mounting locations of the preferably three springs are illustrated in FIG. 6.

For the purposes of the invention, it is preferred that the motor of the power tool is oriented centrally, transversely to the rechargeable batteries and to the working direction of the power tool. As a result, the center of gravity of the power tool is substantially at the center of the motor, and therefore the load on the circumferential, front handle is as small as possible during the operation or carrying of the power tool. In other words, a particularly well-balanced power tool which, despite its weight, can be easily carried and has good ergonomics during cutting can be provided by means of the preferably central arrangement of the motor, the working axis of which is preferably perpendicular to a central axis of the power tool.

For the purposes of the invention, it is preferred that the power tool comprises a motor housing, wherein the motor housing comprises a transmission of the power tool, a cutting arm for a tool of the power tool and a means for driving the tool. The means for driving the tool are preferably designed as a belt. The belt, the transmission and the cutting arm are illustrated in FIG. 5. For the purposes of the invention, it is preferred that the means for driving the tool runs at least partially parallel to the cutting arm. This substantially parallel arrangement of the cutting arm with respect to the belt for driving the tool of the power tool is also depicted in FIG. 5. For the purposes of the invention, it is preferred that the belt is designed to transmit a rotary motion produced in the motor of the power tool to the cutting disk of the cut-off grinder and to drive the cutting disk to perform the rotary motion by means of which the cuts can be produced in the substrate to be machined.

For the purposes of the invention, it is preferred that the power tool comprises at least one guard plate on a front side of the housing of the main body of the power tool in order to protect the power tool and the components thereof. As a particular preference for the purposes of the invention, the guard plate forms a lower region of the circumferential first handle, is fastened to the latter or covers the latter. The front side of the housing of the main body of the power tool preferably faces the tool of the power tool, i.e. preferably faces the cutting disk. Dust, metal chips, sparks and/or sludge splashes may strike this front side of the main body of the power tool, but the guard plate prevents them from damaging the power tool or the main body thereof and its internal components, e.g. the rechargeable batteries. In particular, this protective effect is also improved by the fact that the rechargeable batteries are arranged in a rear region of the main body, i.e. at a maximum distance from the main impact location for dust, metal chips, sparks and/or sludge splashes on the front side of the main body of the power tool. This maximum distance and one possible arrangement of the guard plate are depicted in FIG. 2.

In one exemplary embodiment, the invention relates to a battery-operated cut-off grinder having two rechargeable batteries that are accessible from the rear and are preferably fully covered from above. The housing has optimized edges and/or surfaces for defined water run-off to protect the rechargeable batteries and their interface. The other components of the cut-off grinder are installed around the rechargeable batteries in such a way that a simple construction of the power tool is possible and the power tool has good ergonomics.

In particular, the two rechargeable batteries are well protected from above against environmental influences. This is advantageously achieved by the water drainage provided on the housing, which is made possible, in particular, by the slope of the upper side of the main body of the power tool and/or the provision of the ribs on the housing of the main body of the power tool. To protect the rechargeable batteries from dust, spray or metal sparks, a guard plate is, in particular, provided on the front side of the main body of the power tool. The provision of the rechargeable batteries in a rear, lower region of the main body of the cut-off grinder ensures good access to the rechargeable batteries and good visibility of a state of charge indicator of the rechargeable batteries. In addition, the invention allows good protection of the battery interface, and in particular, of the battery contacts.

Further advantages of the invention consist in mounting the electronics of the power tool in spatial proximity to the rechargeable batteries, thereby making it possible to achieve short transmission paths for the control commands and a reduction in the complexity of cabling. For the purposes of the invention, it is preferred that a central carrier, which is preferably also referred to as a carrier unit, is arranged within the main body of the power tool. This carrier unit is preferably manufactured from plastic or comprises one or more plastics. As a result, the carrier unit can, on the one hand, be of very stable design and, on the other hand, of particularly light design, and therefore it contributes only insignificantly to the overall weight of the power tool. For the purposes of the invention, it is preferred that the carrier unit is connected in a fixed manner to the motor housing and is designed to receive the electronics, the interfaces, the contacts, the rechargeable batteries and/or the damping elements. For the purposes of the invention, it is preferred that the carrier provides an internal structure for the main body of the power tool, wherein the components of the power tool which are provided within the main body can be fastened to the carrier unit. For the purposes of the invention, it is preferred that the protection frame and the upper handle can also be fastened to the carrier unit. The housing of the power tool can preferably consist of two housing shells, which can likewise be mounted on the carrier unit.

For the purposes of the invention, it is preferred that the carrier, together with the motor housing, forms a central component for guiding air for cooling. For the purposes of the invention, it is preferred that the electronics of the power tool are mounted in a suspended manner in or on the carrier unit in order to avoid deposits of dust and/or water in an effective manner. The carrier unit can comprise a heat sink for cooling the electronics, wherein an air flow can be guided through the carrier to cool the electronics. For the purposes of the invention, it is preferred that the carrier unit slopes downward toward the rear at a slope angle, wherein this slope angle of the carrier unit is greater than 3 degrees, preferably in the region of 5 degrees. For the purposes of the invention, it is preferred that the slope angle is formed between an imaginary ground plane on which the power tool can be set down and a plane which extends centrally through the carrier unit of the power tool. For the purposes of the invention, it is preferred that, despite the sloping design of the carrier unit, the interfaces and contacts for connecting the power tool to the rechargeable batteries are of substantially horizontal design. The rechargeable batteries are preferably also oriented substantially horizontally within the power tool. For the purposes of the invention, the term "substantially horizontal" preferably means that said components do not slope in the power tool, that is to say that any straight line or plane passing through them encloses an angle of substantially 0 degrees with an imaginary substrate plane. In other words, an imaginary straight line or plane passes through the interfaces, contact surfaces and/or rechargeable batteries substantially parallel to an imaginary substrate plane.

The slope of the carrier unit is assumed by the upper side or outer contour of the power tool and ensures particularly favorable water run-off and associated protection of the interfaces and contact surfaces of the rechargeable batteries. In addition, ribs lead to drainage of the surface water into uncritical regions of the power tool, thus protecting the interfaces and contact surfaces of the rechargeable batteries in an optimum manner from moisture.

Moreover, the motor of the power tool is arranged transversely to the rechargeable batteries. The power tool preferably comprises a motor housing which, for its part, has a transmission, a belt and a cutting arm. The belt as a drive means for the cutting disk preferably operates with a transmission ratio of 1:1. A second handle with an operating switch is preferably arranged above or in spatial proximity to the electronics of the power tool. Moreover, the cut-off grinder comprises a first handle, which extends around the cut-off grinder and which has an integrated water tap or an integrated water valve. Furthermore, the cut-off grinder comprises a protection frame, which extends around the rechargeable batteries and protects them in an effective manner from shocks or from falling. While the protection frame protects the rechargeable batteries especially from a side impact, a rear part of the upper, second handle projects beyond the main body of the power tool, this projection being referred to as an overlap. The overlap can have a length in a range of about 6 cm, for example; it protects the power tool especially from an impact on the rear side of the power tool. The protection frame and the handles of the cut-off grinder are preferably decoupled from the vibrations which arise during the operation of the cut-off grinder due to the rotation of the cutting disk. For this purpose, the cut-off grinder can have damping means, which are formed by springs, for example. An aid for changing the cutting disk can be fixed on the underside of the power tool by means of an O ring. For the purposes of the invention, it is preferred that the cutting disk of the cut-off grinder has a blade diameter greater than 230 mm.

BRIEF DESCRIPTION OF THE DRAWINGS

Further advantages will become apparent from the following description of the figures. The figures, the description and the claims contain numerous features in combination. A person skilled in the art will expediently also consider the features individually and combine them to form useful further combinations.

In the figure, the same and similar components are numbered with the same reference signs. In the figure.

DETAILED DESCRIPTION

Figure 1:
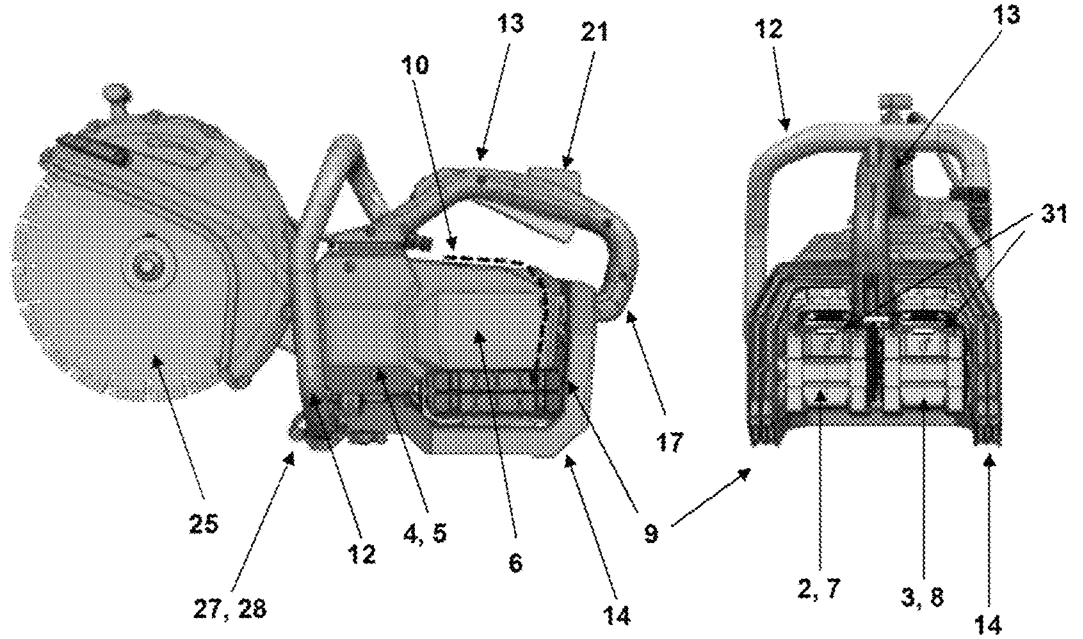
FIG. 1 shows a side view and a rear view and an enlarged partial view of a preferred configuration of the power tool
Figure 1:
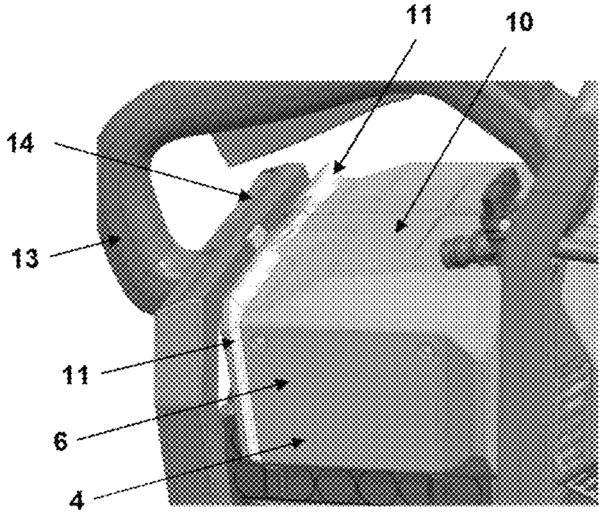

In the left-hand half of the image, FIG. 1 shows a side view of a preferred configuration of the power tool 1 and, in the right-hand half of the image, shows a rear view of a preferred configuration of the power tool 1. The front region of the power tool 1 is formed by a tool 25, which, in the case of the cut-off grinder 1 depicted in FIG. 1, is formed by a cutting disk 25. The tool 25 can be surrounded by a blade guard, which can comprise a water supply and a handle. The rear region of the power tool 1 is formed by a main body 4, which has a housing 6. The main body 4 of the power tool 1 is surrounded by a protection frame 14, which comprises an L-shaped structure 16 (see, e.g., FIG. 3). The L-shaped structure 16 preferably comprises a substantially horizontal lower region, which extends on the underside of the housing 6 of the power tool 1. In addition, the L-shaped structure 16 can comprise a substantially vertical rear part, which extends along a rear side 9 of the main body 4 of the power tool 1. The protection frame 14 preferably comprises two L-shaped structures 16, which are connected to one another by respective connecting webs on the rear side 9 and on the front handle 12 of the main body 4 of the power tool 1. For the purposes of the invention, it is preferred that the protection frame 14 comprises a plastic injection molding, preferably of circumferential design, which can have a U-shaped profile with ribs.

In addition, the power tool comprises a front, circumferential handle 12 and an upper, second handle 13. Operating switches 21, by means of which the power tool 1 can be operated, are arranged on the upper, second handle 13. In particular, these operating switches 21 can be arranged on the underside of the second handle 13. The power tool 1 can furthermore have a switch-on lock 30 (see, e.g., FIG. 3), which can preferably be arranged on the upper side of the second handle 13. For the purposes of the invention, it is preferred that the operating switch 21 can be operated only when the switch-on lock 30 permits this. For the purposes of the invention, it is preferred that the underside of the second handle 13 faces or lies opposite the upper side 10 of the housing 6 of the power tool 1. The upper side 10 of the housing 6 is preferably designed to slope by 3 to 5 degrees, that is to say liquid which falls on the upper side 10 of the housing 6 is deflected rearward and/or downward in a spatial direction. This slope is described by the slope angle B (see FIG. 7). The deflection of the liquid is illustrated in FIG. 1 by the dashed line in the region of the housing 6 of the power tool 1. The liquid run-off can be further improved by the presence of ribs 11 on the housing 6 of the main body 4 of the power tool 1, illustrated in the image at the bottom of FIG. 1.

The ribs 11 preferably form a raised boundary of the main body 4 of the power tool 1. The ribs 11 preferably form a boundary edge of the main body 4 of the power tool 1, which is arranged inter alia on the upper side 10 of the housing 6 of the power tool 1. Ribs 11 can also be formed on the sides of the main body 4 of the power tool 1 and on the rear boundary of the housing 6 of the power tool 1. For the purposes of the invention, it is preferred that the ribs 11 have a height of up to 2 cm. Thus, the ribs 11 can have a height of 1.75 cm, 1.33 cm, 1 cm, 0.5 cm or 0.3 cm, without being restricted thereto. For the purposes of the invention, it is preferred that the ribs 11 are designed to guide a flow of water, ensuring that dirty water and/or rainwater do/does not get into the region of sensitive components of the power tool 1. Sensitive regions of the power tool 1 are the rechargeable batteries 2, 3 and/or the interfaces 18 or contacts 19 thereof (see, e.g, FIG. 3) or their state of charge indicator 31 (see, e.g, FIG. 1), for example.

The region of the second handle 13 in which the at least one operating switch 21 is arranged is referred to as the central part of the second handle 13 and is preferably also of sloping design. The second handle 13 preferably projects beyond a rear side 9 of the main body 4 of the power tool 1, thereby forming what is referred to as an overlap 17 (see, e.g, FIG. 1). As a result, the power tool 1 and the internal components thereof can be particularly well protected from shocks and impacts acting on the power tool 1 from the direction of the rear side 9 of the main body 4. In other words, the overlap 17 of the second handle 13 protects the power tool 1 particularly well if there is a risk of its falling on its rear side 9 when dropped.

The overlap 17 also has the further advantage that the spacing between the two handles 12, 13 is increased, and therefore handling of the power tool 1 can be improved and made safer.

The motor 5 is arranged in a front region of the main body 4 of the power tool 1. A guard plate 28, which protects the main body 4 and the internal components thereof from dust, flying sparks, dirty water or spray or metal chips, can be arranged on a front side 27 of the housing 6 of the power tool 1. The rechargeable batteries 2, 3 of the power tool 1, which supply the power tool 1 with energy, are situated in a rear, lower region of the main body 4 of the power tool 1. They thus serve as a source of energy for the power tool 1. The first rechargeable battery 2 is arranged in a first receiving space 7, while the second rechargeable battery 3 is arranged in a second receiving space 8. The arrangement of the rechargeable batteries 2, 3 in the receiving spaces 7, 8 within the main body 4 of the power tool 1 is also readily apparent from the right-hand half of the image in FIG. 1, which shows a rear side 9 of the main body 4 of the power tool 1.

Figure 2:
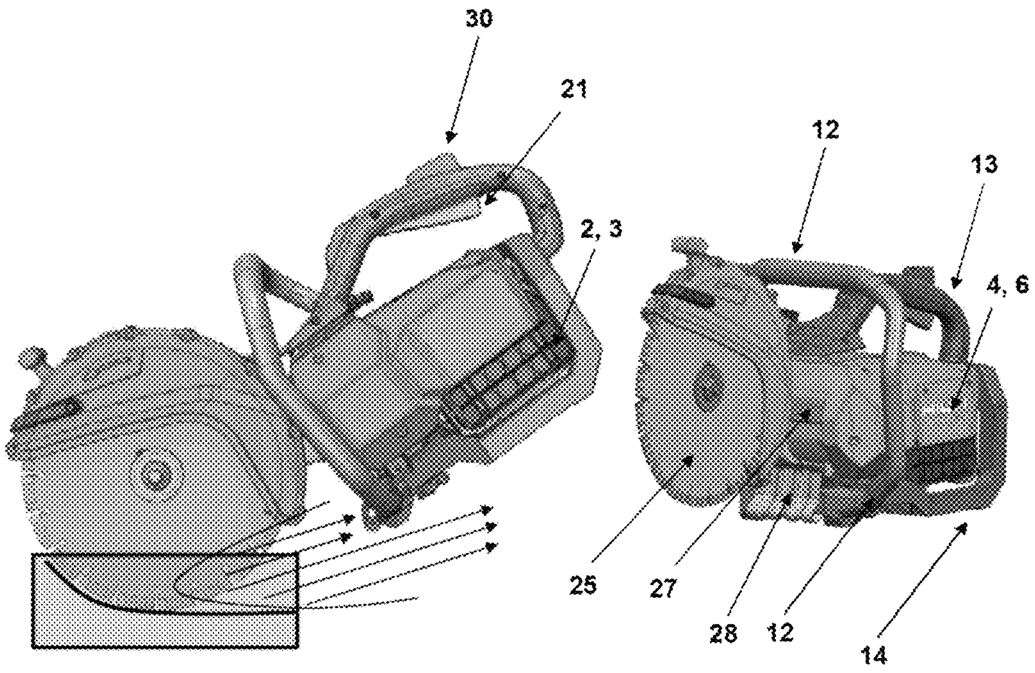
FIG. 2 shows a side view and an oblique front view of a preferred configuration of the power tool

A guard plate 28, which protects the main body 4 and the internal components thereof from dust, flying sparks, dirty water or spray or metal chips, can be arranged on a front side 27 of the housing 6 of the power tool 1. The front side 27 of the housing 6 of the power tool 1 and the guard plate 28, which is situated on the front side 27 of the housing 6 of the power tool 1 is also illustrated, in particular, in FIG. 2. For the purposes of the invention, it is preferred that the guard plate 28 is fastened to the front, circumferential handle 12 or forms a part of said front handle 12. The flight paths of possible objects from which the guard plate 28 is supposed to protect the handheld power tool 1 are indicated in FIG. 2 (see arrows at the bottom left). The guard plate 28 is preferably made of metal or some other fire-resistant material to enable the power tool 1 to be protected especially also from hot sparks. For the purposes of the invention, it is preferred that the front side 27 of the housing 6 of the power tool 1 faces or is arranged opposite the tool 25 of the power tool 1. In the left-hand half of the image, in particular, FIG. 2 shows a side view of a preferred configuration of the power tool 1 and, in the right-hand half of the image, shows an oblique front view of the power tool 1.

Figure 3:
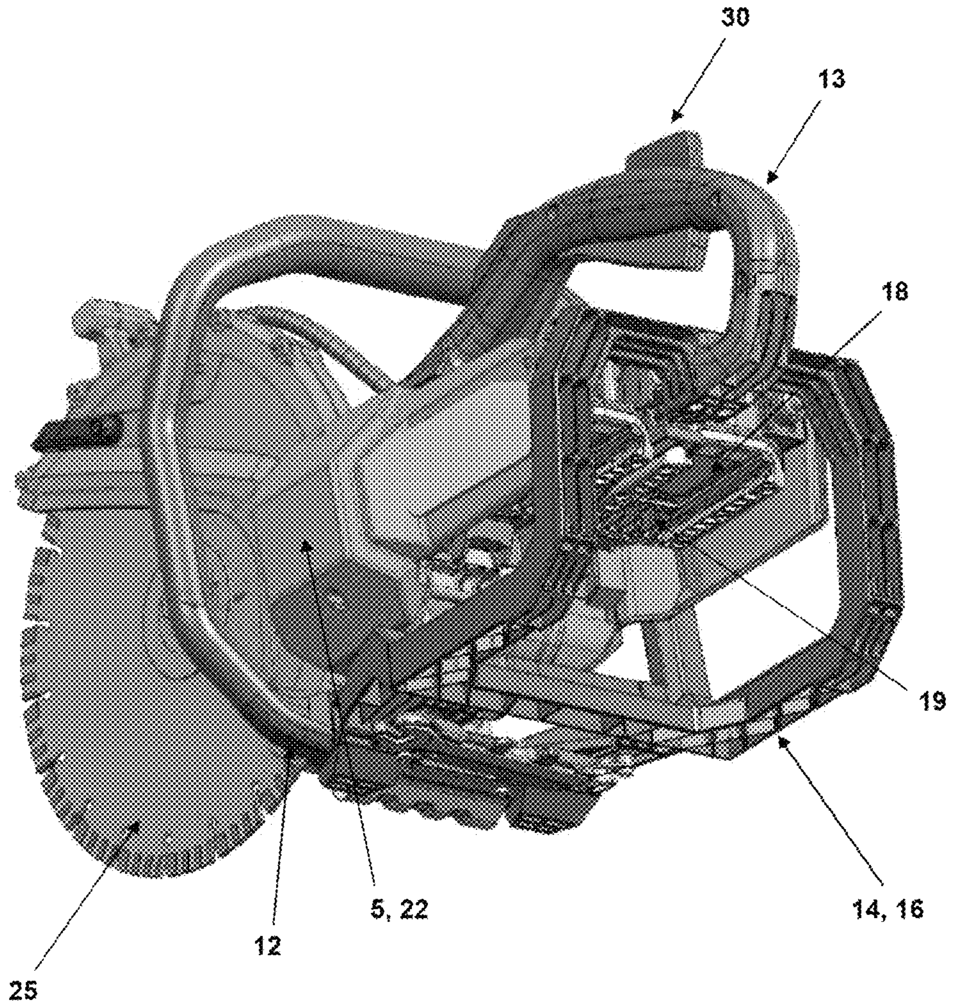
FIG. 3 shows a preferred configuration of the power tool without rechargeable batteries

FIG. 3 shows a rear view of a preferred configuration of the power tool 1 without rechargeable batteries 2, 3. It illustrates the protection frame 14, the first handle 12 and the second handle 13. The main body 4 of the power tool 1 with its housing 6 is preferably situated within the protection frame 14, wherein the rechargeable batteries 2, 3 and the receiving spaces 7, 8 thereof are arranged within the main body 4 of the power tool 1. In particular, the rechargeable batteries 2, 3 and the receiving spaces 7, 8 thereof are situated in a rear, lower region of the main body 4 of the power tool 1. The housing 6 of the main body 4 of the power tool 1 comprises a rear side 9, which forms the rear boundary of the main body 4 of the power tool 1. The state of charge indicator 31 of the rechargeable batteries 2, 3 is readily visible from the rear below the housing 6 and behind the protection frame 14 of the power tool 1.

Owing to the fact that the rechargeable batteries 2, 3 are not illustrated in FIG. 3, the interface 18 and the contacts 19 for the rechargeable batteries 2, 3 are visible in FIG. 3.

Figure 4:
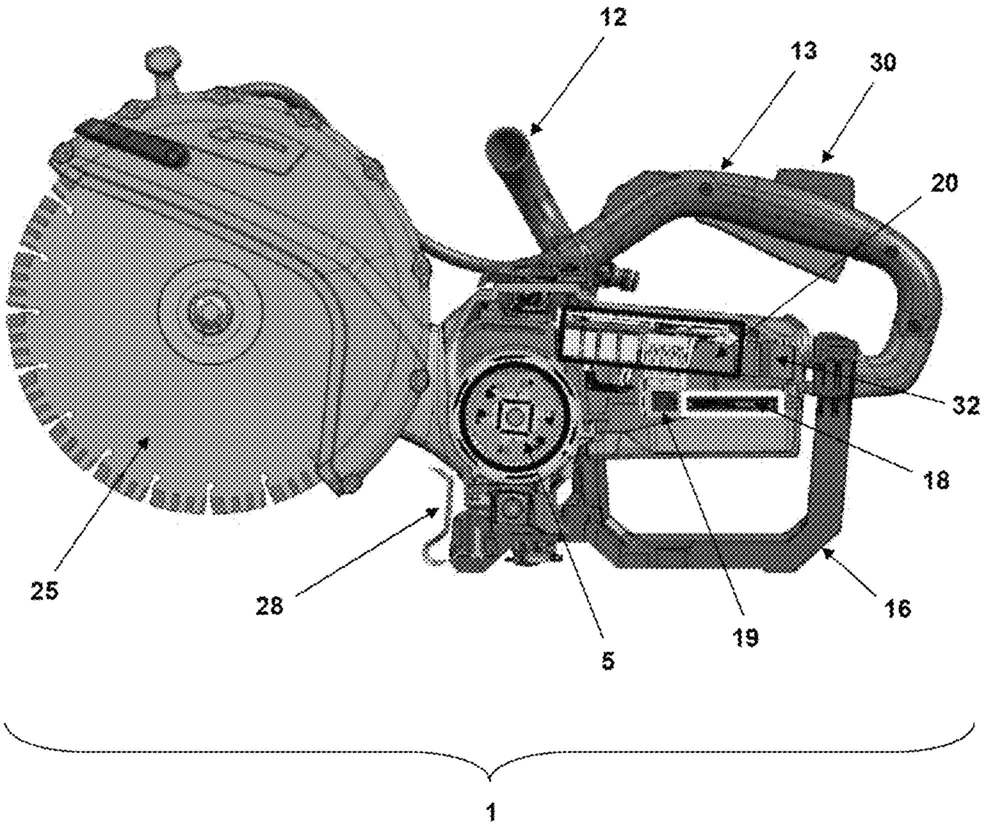
FIG. 4 shows a side view of a preferred configuration of the power tool without rechargeable batteries

The interface 18 and the contacts 19 for the rechargeable batteries 2, 3 are also illustrated in FIG. 4, which shows a side view of a preferred configuration of the power tool 1 without rechargeable batteries 2, 3. The electronics 20 of the power tool 1 are arranged above the interface 18 and above the contacts 19 for the rechargeable batteries 2, 3, wherein the electronics 20 are situated in spatial proximity to the operating switches 21 on the second handle 13 of the power tool 1 in order to keep transmission and communication paths short. Provision is furthermore made for the electronics 20 to be situated in spatial proximity to the rechargeable batteries 2, 3; this is also intended to shorten the transmission and communication paths. The electronics 20 are preferably held by a central carrier 32, which is preferably also referred to as a carrier unit 32. For the purposes of the invention, it is preferred that the carrier unit 32 is connected in a fixed manner to the motor housing 22 and is designed to receive the electronics 20, the interfaces 18, the contacts 19, the rechargeable batteries 2, 3 and/or the damping elements 15 of the power tool 1. For the purposes of the invention, it is particularly preferred that the carrier 32 forms an internal structure for the main body 4 of the power tool 1 which can support or accommodate said components of the power tool 1.

Figure 5:
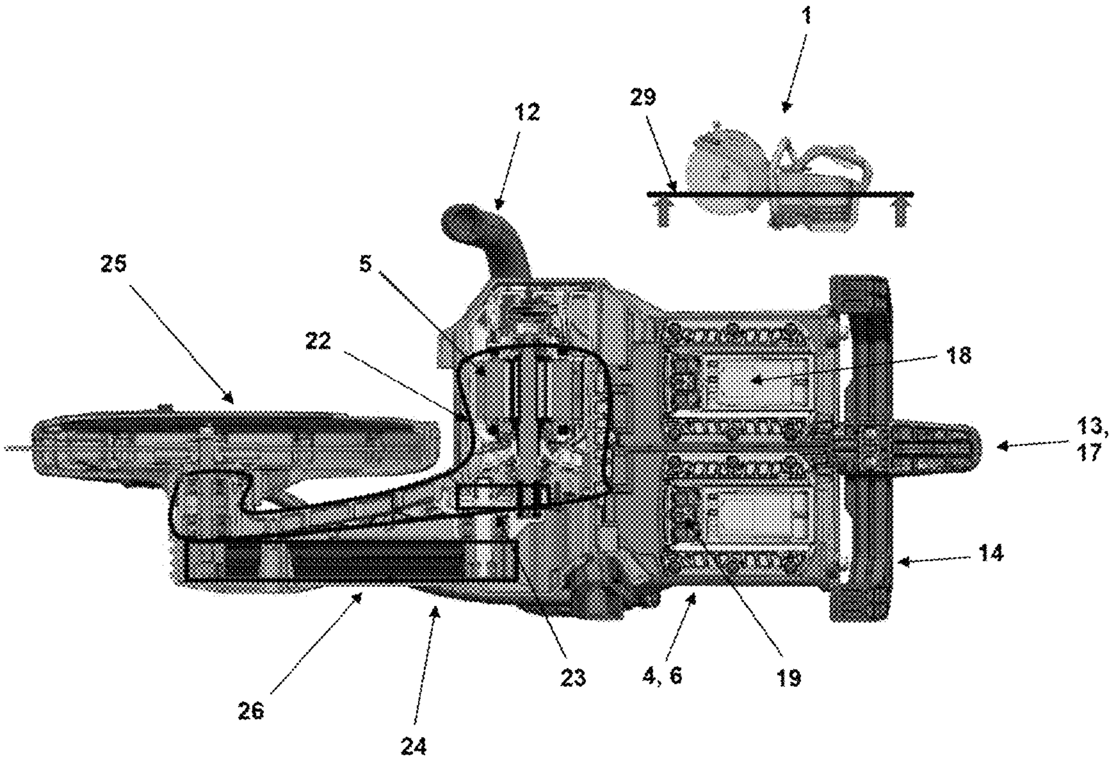
FIG. 5 shows a view of an underside of a preferred configuration of the power tool

Also shown in FIG. 4 is the motor 5 of the power tool 1, which is arranged in a front region of the main body 4 of the power tool 1. The motor 5 has an axis which is formed substantially orthogonally to a longitudinal axis 29 of the power tool 1. In other words, the axis of the motor 5 of the power tool 1 is preferably perpendicular to the longitudinal axis 29 of the power tool 1 (see, e.g, FIG. 5). For the purposes of the invention, this arrangement is described by the wording that the motor 5 of the power tool 1 is oriented transversely to the rechargeable batteries 2, 3 of the power tool 1. In practice, the motor axis projects out of the plane of the image in FIG. 4, and its position is also illustrated in FIG. 5. FIG. 5 also shows one possible position of the imaginary longitudinal axis 29 of the power tool 1 (see top right of FIG. 5). The motor housing 22 can have air outlets, from which the spent cooling air can be expelled from the interior of the power tool 1. In particular, slots from which the cooling air is expelled can be provided on the underside and/or rear side of the motor housing 22.

FIG. 5 shows the view of an underside of a preferred configuration of the power tool 1. The motor 5 is arranged in a front region of the main body 4 of the power tool 1. It is surrounded by a motor housing 22. The movement which is produced by the motor 5 of the power tool 1 is transmitted to the tool 25 of the power tool 1 via drive means 26. Arranged between the drive means 26 and the motor 5 is a transmission 23 of the power tool, which is preferably likewise arranged within the motor housing 22. The drive means 26 can comprise a belt or can be formed by such a belt. The cutting disk 25 of the cut-off grinder 1 is connected to the main body 4 of the cut-off grinder 1 by a cutting arm 24, wherein the belt 26 for transmitting the movement of the motor 5 of the cut-off grinder 1 runs at least partially parallel to the cutting arm 24. The rechargeable batteries 2, 3 are not illustrated in FIG. 5. By virtue of their omission, it is possible to see the battery interface 18 and the connecting contacts 19, which connect the rechargeable batteries 2, 3 to the power tool 1 electrically or electronically.

Figure 6:
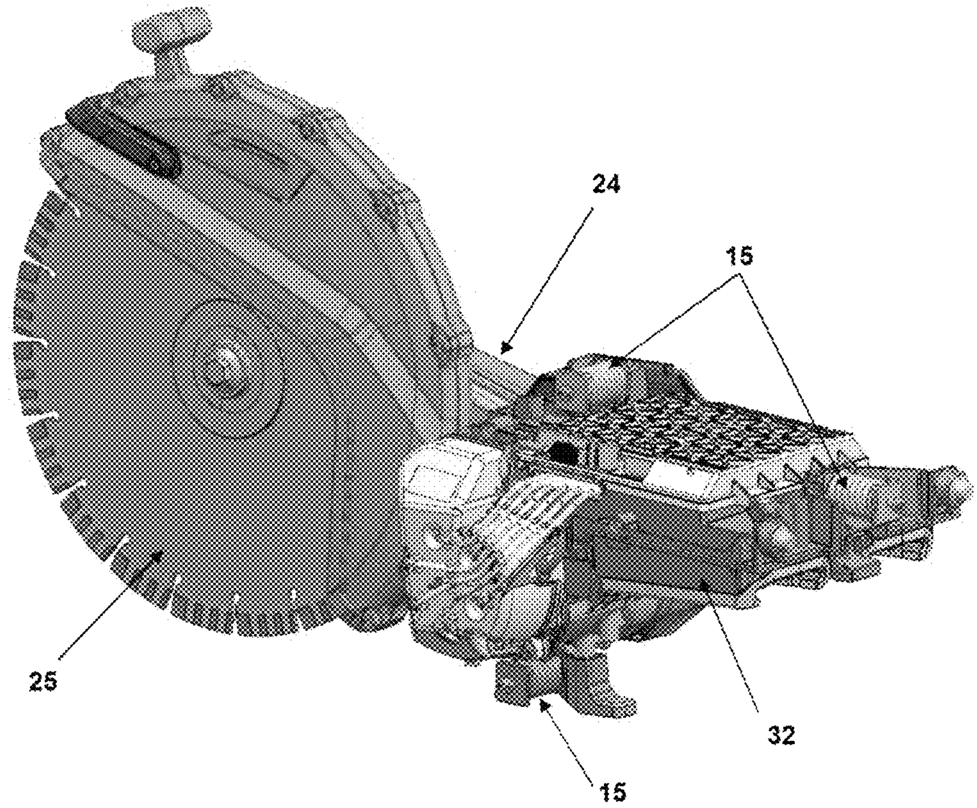
FIG. 6 shows an oblique rear view of a preferred configuration of the power tool without rechargeable batteries, without a transmission, without a protection frame and without handles

FIG. 6 shows an oblique rear view of a preferred configuration of the power tool 1 without rechargeable batteries 2, 3, without a transmission 23, without a protection frame 14 and without handles 12, 13. In particular, FIG. 6 illustrates the damping means 15, by means of which the protection frame 14 and the handles 12, 13 can be decoupled from the vibrations which arise during the operation of the power tool 1. The damping means 15 preferably comprise springs, or the damping means 15 are formed by springs. For the purposes of the invention, it is preferred that the power tool 1 has three damping means 15 or springs for oscillation and vibration decoupling. This is an effective means of avoiding the transmission of vibrations to the user, especially the hands, arms and shoulders, making it possible to work with the power tool 1 for longer and in a more healthy manner. Moreover, FIG. 6 shows the carrier unit 32, which is arranged within the main body 4 of the power tool 1.

Figure 7:
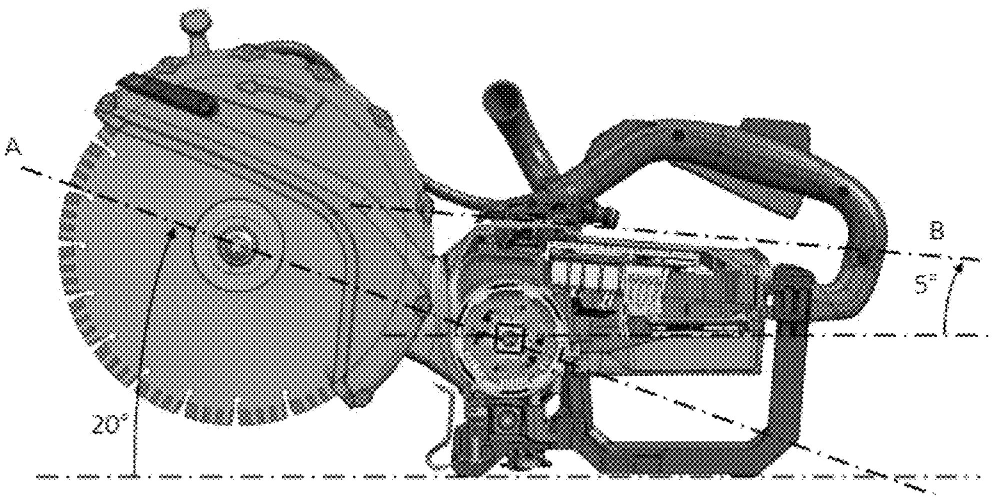
FIG. 7 shows a side view of a preferred configuration of the power tool as a section with the angles and slope indicated

FIG. 7 shows the slope angle A between the motor and the cutting axis as well as the slope angle B, at which the surface 10 of the housing 6 of the power tool 1 slopes. Slope angle A can be between 10 and 30 degrees, for example, while slope angle B is about 5 degrees.

LIST OF REFERENCE SIGNS

1 Power tool
2 First rechargeable battery
3 Second rechargeable battery
4 Main body
5 Motor
6 Housing
7 First receiving space
8 Second receiving space
9 Rear side of the main body
10 Upper side of the housing
11 Ribs
12 First, circumferential handle
13 Second, upper handle
14 Protection frame
15 Damping means
16 L-shaped structure
17 Overlap
18 Interface between rechargeable batteries and power tool
19 Contacts between rechargeable batteries and power tool
20 Electronics of the power tool
21 Operating switch
22 Motor housing
23 Transmission
24 Cutting arm
25 Tool or cutting disk
26 Drive means or belt
27 Front side of the housing
28 Guard plate
29 Longitudinal axis of the power tool
30 Switch-on lock
31 State of charge indicator
32 Carrier unit
A Slope angle between motor and cutting axis
B Slope of the surface of the main body of the power tool

What is claimed is:

1. A power tool comprising:
a first rechargeable battery and a second rechargeable battery as energy sources;
a main body having a housing; and
a motor, the main body having a first receiving space for receiving the first rechargeable battery, and a second receiving space for receiving the second rechargeable battery, the first and second receiving spaces being arranged within the housing so that the rechargeable batteries are accessible and replaceable from a rear side of the main body, the first and second receiving spaces forming a lower boundary of the main body;
the housing having ribs to ensure liquid run off in a defined manner.

2. The power tool as recited in claim 1 wherein an upper side of the housing is designed to slope to ensure liquid run off in a defined manner.

3. The power tool as recited in claim 1 wherein the power tool has no additional flap or additional cover to protect the rechargeable batteries from liquid.

4. The power tool as recited in claim 1 further comprising a first, circumferential handle, a second, upper handle, and a protection frame for protecting the main body.

5. The power tool as recited in claim 4 further comprising a damper to decouple the first and second handles and the protection frame from vibrations arising during operation of the power tool.

6. The power tool as recited in claim 4 wherein the protection frame has an L-shaped structure.

7. The power tool as recited in claim 4 wherein the second handle projects beyond the main body in a rearward spatial direction and thus forms an overlap.

8. The power tool as recited in claim 1 wherein the motor is oriented transversely to the rechargeable batteries.

9. The power tool as recited in claim 1 wherein the power tool is a cut-off grinder.

10. The power tool as recited in claim 1 wherein the rechargeable batteries are connectable to electronics of the power tool via an interface and contacts.

11. The power tool as recited in claim 10 further comprising an upper handle above the electronics.

12. The power tool as recited in claim 1 further comprising a motor housing including a transmission, a cutting arm for a tool and at least one drive for driving the tool.

13. The power tool as recited in claim 12 wherein the at least one drive for driving the tool runs at least partially parallel to the cutting arm.

14. The power tool as recited in claim 1 further comprising at least one guard plate on a front side of the housing in order to protect the power tool.

15. The power tool as recited in claim 1 wherein the ribs form a raised boundary of the main body.

16. A power tool comprising:

a first rechargeable battery and a second rechargeable battery as energy sources;

a main body having a housing; and a motor, the main body having a first receiving space for receiving the first rechargeable battery, and a second receiving space for receiving the second rechargeable battery, the first and second receiving spaces being arranged within the housing so that the rechargeable batteries are accessible and replaceable from a rear side of the main body, the first and second receiving spaces forming a lower boundary of the main body;

wherein the power tool has no additional flap or additional cover to protect the rechargeable batteries from liquid.

17. A power tool comprising:

a first rechargeable battery and a second rechargeable battery as energy sources;

a main body having a housing;

a motor, the main body having a first receiving space for receiving the first rechargeable battery, and a second receiving space for receiving the second rechargeable battery, the first and second receiving spaces being arranged within the housing so that the rechargeable batteries are accessible and replaceable from a rear side of the main body, the first and second receiving spaces forming a lower boundary of the main body;

a first, circumferential handle; a second, upper handle; and a protection frame for protecting the main body.

18. A power tool comprising:

a first rechargeable battery and a second rechargeable battery as energy sources;

a main body having a housing; and a motor, the main body having a first receiving space for receiving the first rechargeable battery, and a second receiving space for receiving the second rechargeable battery, the first and second receiving spaces being arranged within the housing so that the rechargeable batteries are accessible and replaceable from a rear side of the main body, the first and second receiving spaces forming a lower boundary of the main body;

wherein the motor is oriented transversely to the rechargeable batteries.

19. A power tool comprising:

a first rechargeable battery and a second rechargeable battery as energy sources;

a main body having a housing;

a motor, the main body having a first receiving space for receiving the first rechargeable battery, and a second receiving space for receiving the second rechargeable battery, the first and second receiving spaces being arranged within the housing so that the rechargeable batteries are accessible and replaceable from a rear side of the main body, the first and second receiving spaces forming a lower boundary of the main body;

a motor housing including a transmission; a cutting arm for a tool; and at least one drive for driving the tool.

20. A power tool comprising:

a first rechargeable battery and a second rechargeable battery as energy sources;

a main body having a housing;

a motor, the main body having a first receiving space for receiving the first rechargeable battery, and a second receiving space for receiving the second rechargeable battery, the first and second receiving spaces being arranged within the housing so that the rechargeable batteries are accessible and replaceable from a rear side of the main body, the first and second receiving spaces forming a lower boundary of the main body;

a motor housing including a transmission; a cutting arm for a tool; and at least one guard plate on a front side of the housing in order to protect the power tool.

* * * * *